(12) United States Patent
Yoshida et al.

(10) Patent No.: US 12,234,923 B2
(45) Date of Patent: Feb. 25, 2025

(54) ELECTRIC VALVE

(71) Applicant: FUJIKOKI CORPORATION, Tokyo (JP)

(72) Inventors: Tatsuya Yoshida, Tokyo (JP); Yuta Matsubara, Tokyo (JP); Yusuke Arai, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 18/272,958

(22) PCT Filed: Jan. 24, 2022

(86) PCT No.: PCT/JP2022/002381
§ 371 (c)(1),
(2) Date: Jul. 18, 2023

(87) PCT Pub. No.: WO2022/168651
PCT Pub. Date: Aug. 11, 2022

(65) Prior Publication Data
US 2024/0084914 A1    Mar. 14, 2024

(30) Foreign Application Priority Data

Feb. 8, 2021    (JP) .................... 2021-018392

(51) Int. Cl.
*F16K 31/04*    (2006.01)
*F16K 27/02*    (2006.01)
(Continued)

(52) U.S. Cl.
CPC ............ *F16K 31/04* (2013.01); *F16K 27/029* (2013.01); *F16K 37/0033* (2013.01); *H02K 11/215* (2016.01); *H02K 11/33* (2016.01)

(58) Field of Classification Search
CPC .... F16K 31/04; F16K 27/029; F16K 37/0033; H02K 11/215; H02K 11/33
(Continued)

(56) References Cited

U.S. PATENT DOCUMENTS 6,522,038 B2 * 2/2003 Byram .................... F02D 11/10
73/514.39
10,263,499 B2    4/2019 Yamashita
(Continued)

FOREIGN PATENT DOCUMENTS

DE    10103209 A1    7/2002
EP    3223408 A1    9/2017
(Continued)

OTHER PUBLICATIONS

International Search Report and Written Opinion for the corresponding application No. PCT/JP2022/002381, dated Mar. 1, 2022, with English translation.
(Continued)

*Primary Examiner* — John Bastianelli
(74) *Attorney, Agent, or Firm* — LUCAS & MERCANTI, LLP

(57) ABSTRACT

A stator unit includes a main circuit board parallel to an up-and-down direction, a sub circuit board at a right angle to the main circuit board, a magnetic sensor on the sub circuit board, and a housing including a sub circuit board space that is located adjacent to an inner space of the stator unit in which a can is disposed. The sub circuit board includes a first end connected to the main circuit board via a circuit board terminal and a second end located near the inner space in the sub circuit board space. The magnetic sensor is located closer to the inner space than the circuit board terminal is.

9 Claims, 20 Drawing Sheets

(51) Int. Cl.
  *F16K 37/00* (2006.01)
  *H02K 11/215* (2016.01)
  *H02K 11/33* (2016.01)

(58) Field of Classification Search
  USPC ........................................ 251/129.11–129.13
  See application file for complete search history.

(56) References Cited

U.S. PATENT DOCUMENTS

| | | | |
|---|---|---|---|
| 2003/0178004 A1* | 9/2003 | Keefover | F02D 9/107 |
| | | | 251/305 |
| 2010/0276616 A1* | 11/2010 | Kim | F16K 31/04 |
| | | | 251/129.11 |
| 2014/0231684 A1 | 8/2014 | Shimura et al. | |
| 2016/0233737 A1 | 8/2016 | Nakamura et al. | |
| 2016/0254732 A1 | 9/2016 | Kojima et al. | |
| 2018/0299029 A1 | 10/2018 | Uehara et al. | |

FOREIGN PATENT DOCUMENTS

| | | |
|---|---|---|
| JP | 2008-140728 A | 6/2008 |
| JP | 2014-161152 A | 9/2014 |
| JP | 2016-103966 A | 6/2016 |
| JP | 2016-163416 A | 9/2016 |
| JP | 2018-179133 A | 11/2018 |
| WO | 2013/140685 A1 | 9/2013 |

OTHER PUBLICATIONS

International Preliminary Report on Patentability for the corresponding application No. PCT/JP2022/002381, dated Mar. 23, 2023, with English translation.
JPO, Japanese Office Action mailed Jun. 4, 2024 for the related Japanese application No. 2022-579447, with English Machine translation, 8 pages.
EPO, Extended European Search Report issued on Oct. 16, 2024 for the related European patent application No. 22749526.4, 10 pages.

* cited by examiner

ELECTRIC VALVE

CROSS REFERENCE TO RELATED APPLICATION

This Application is a 371 of PCT/JP2022/002381 filed on Jan. 24, 2022 which, in turn, claimed the priority of Japanese Patent Application No. 2021-018392 filed on Feb. 8, 2021, and both applications are incorporated herein by reference.

TECHNICAL FIELD

The present invention relates to an electric valve.

BACKGROUND ART

Patent Literature 1 discloses an example of an electric valve according to the related art. The electric valve in Patent Literature 1 includes a can, a magnet rotor, a permanent magnet, a stator, and a circuit board. The can has a circular cylindrical shape that is closed at the upper end. The magnet rotor is disposed inside the can. The permanent magnet is located above the magnet rotor inside the can. The permanent magnet rotates together with the magnet rotor. The stator is disposed coaxially with the magnet rotor on the outer circumferential surface of the can. A magnetic sensor is mounted on the circuit board and detects a rotational angle of the permanent magnet. Locating the magnetic sensor near the can (the permanent magnet) allows for more accurate detection of the rotational angle.

CITATION LIST

Patent Literature

Patent Literature 1: Japanese Unexamined Patent Application Publication No. 2018-179133

SUMMARY OF INVENTION

Technical Problem

In the electric valve described above, the circuit board is located above the can. The circuit board is perpendicular to a rotational axis of the magnet rotor, and the magnetic sensor is located near the can. This causes the electric valve to have a large shape in plan view and a large height dimension. In addition, it is difficult to locate the magnetic sensor near the can in a configuration in which the circuit board is located laterally adjacent to the can and parallel to the rotational axis of the magnet rotor, due to the stator between the circuit board and the can.

Accordingly, it is an object of the present invention to provide a small electric valve in which a magnetic sensor can be located near a can.

Solution to Problem

To achieve the object described above, an electric valve according to the present invention includes a valve body, a can that is bonded to the valve body, a magnet rotor that is disposed inside the can, and a stator unit that includes an inner space in which the can is disposed. The stator unit includes a housing, a stator in a circular cylindrical shape that is housed in the housing, a main circuit board in a flat plate-like shape, a sub circuit board in a flat plate-like shape, and a magnetic sensor that is mounted on the sub circuit board. The housing includes a sub circuit board space that is located adjacent to the inner space. A first end of the sub circuit board is connected to the main circuit board via a circuit board terminal. A second end of the sub circuit board is located near the inner space in the sub circuit board space. The magnetic sensor is located closer to the inner space than the circuit board terminal is.

According to the present invention, the magnetic sensor is mounted on the sub circuit board. The housing includes the sub circuit board space that is located adjacent to the inner space in which the can is disposed. The first end of the sub circuit board is connected to the main circuit board via the circuit board terminal. The second end of the sub circuit board is located near the inner space in the sub circuit board space. In the sub circuit board, the second end is on the opposite side of the first end. The magnetic sensor is located closer to the inner space than the circuit board terminal is. With this configuration, the magnetic sensor can be located near the can. Electronic components are shared by and mounted on the main circuit board and the sub circuit board, allowing the main circuit board to be decreased in size. Therefore, the magnetic sensor can be located near the can, and the electric valve can be decreased in size.

In the present invention, preferably, the housing includes a partition wall that separates the sub circuit board space from the inner space. This configuration inhibits electrostatic discharge from the can to the sub circuit board. This configuration prevents water entered into the inner space from entering the sub circuit board space.

In the present invention, preferably, the housing includes a press-fit groove into which the sub circuit board is press-fitted. With this configuration, the sub circuit board can be supported by the housing. As a result, a separate member to support the sub circuit board can be omitted.

In the present invention, preferably, the press-fit groove has an inner surface on which a projection is provided, and the projection is in an elastically deformed shape when the sub circuit board is press-fitted into the press-fit groove. With this configuration, the projection presses the sub circuit board, and the sub circuit board can be more securely supported.

In the present invention, preferably, the magnetic sensor is located at the second end. With this configuration, the magnetic sensor can be located closer to the can.

In the present invention, preferably, the main circuit board is disposed parallel to a direction of an axis of the stator. Preferably, the sub circuit board is disposed at a right angle to the main circuit board. With this configuration, the electric valve can be further decreased in size.

In the present invention, preferably, the sub circuit board is disposed parallel to the direction of the axis. Among various surface-mount package type magnetic sensors, a magnetic sensor with a magneto-sensitive surface on the upper surface of the package (a surface of the package of the magnetic sensor parallel to a circuit board on which the magnetic sensor is mounted) is relatively inexpensive. The sub circuit board is disposed parallel to the direction of the axis of the stator, allowing the upper surface of the package of the magnetic sensor mounted on the sub circuit board to face the outer circumferential surface of the can. As a result, the relatively inexpensive magnetic sensor can be employed, and the components cost of the electric valve can be reduced.

In the present invention, preferably, the stator unit further includes a case that is bonded to the housing. Preferably, the case includes a wall portion and a supporting column that is provided on the wall portion. Preferably, the wall portion includes a case opening that is connected to the sub circuit board space. Preferably, the supporting column extends in a direction perpendicular to the direction of the axis and a tip end of the supporting column points in a direction away from the inner space. Preferably, the main circuit board includes a penetrating hole. Preferably, the sub circuit board is disposed across the case and the sub circuit board space. Preferably, a sub circuit board supporting member is mounted on the sub circuit board. Preferably, the sub circuit board supporting member includes a mounting portion in a cylindrical shape. Preferably, the supporting column is disposed inside the mounting portion and disposed in the penetrating hole. Preferably, a diameter of the tip end of the supporting column is larger than a diameter of the penetrating hole. Preferably, the mounting portion is interposed between the wall portion and the main circuit board. With this configuration, the mounting portion of the sub circuit board supporting member is interposed between the wall portion of the case and the main circuit board, allowing the sub circuit board supporting member to be fixed. As a result, the sub circuit board can be securely supported.

In the present invention, preferably, the electric valve further includes a permanent magnet that rotates together with the magnet rotor. Preferably, the magnetic sensor is located such that the magnet sensor senses a magnetic field generated by the permanent magnet. With this configuration, the permanent magnet generates a stronger magnetic field than the magnet rotor, allowing the sensing range of the magnetic sensor for the magnetic field to be further extended. As a result, a limitation on a location of the magnetic sensor can be relaxed.

Advantageous Effects of Invention

According to the present invention, the magnetic sensor can be located near the can, and the electric valve can be decreased in size.

DESCRIPTION OF EMBODIMENTS

First Embodiment

An electric valve 1 according to a first embodiment of the present invention is illustrated below with reference to FIG. 1 to FIG. 9.

Figure 1:
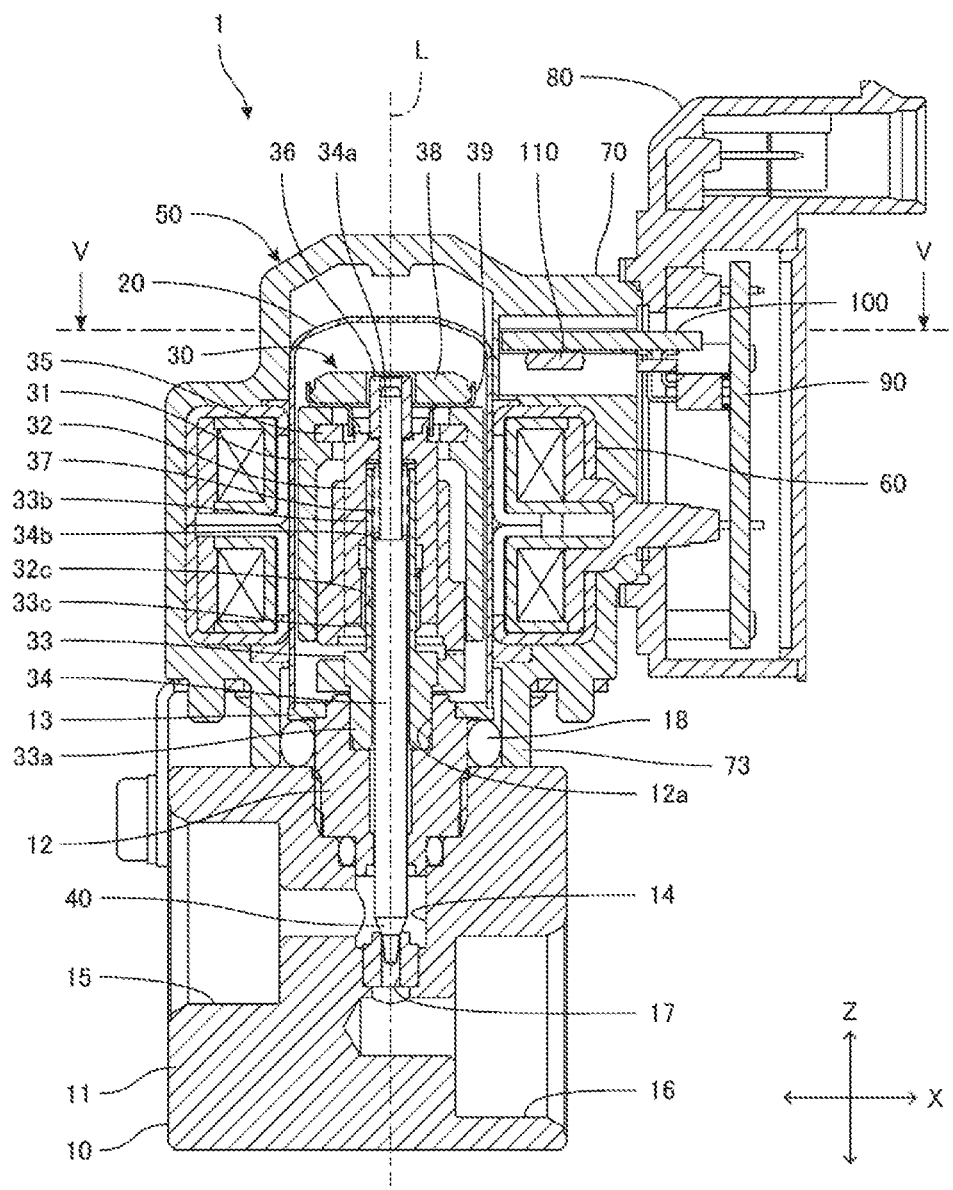
FIG. 1 is a sectional view of an electric valve according to a first embodiment of the present invention.
Figure 2:
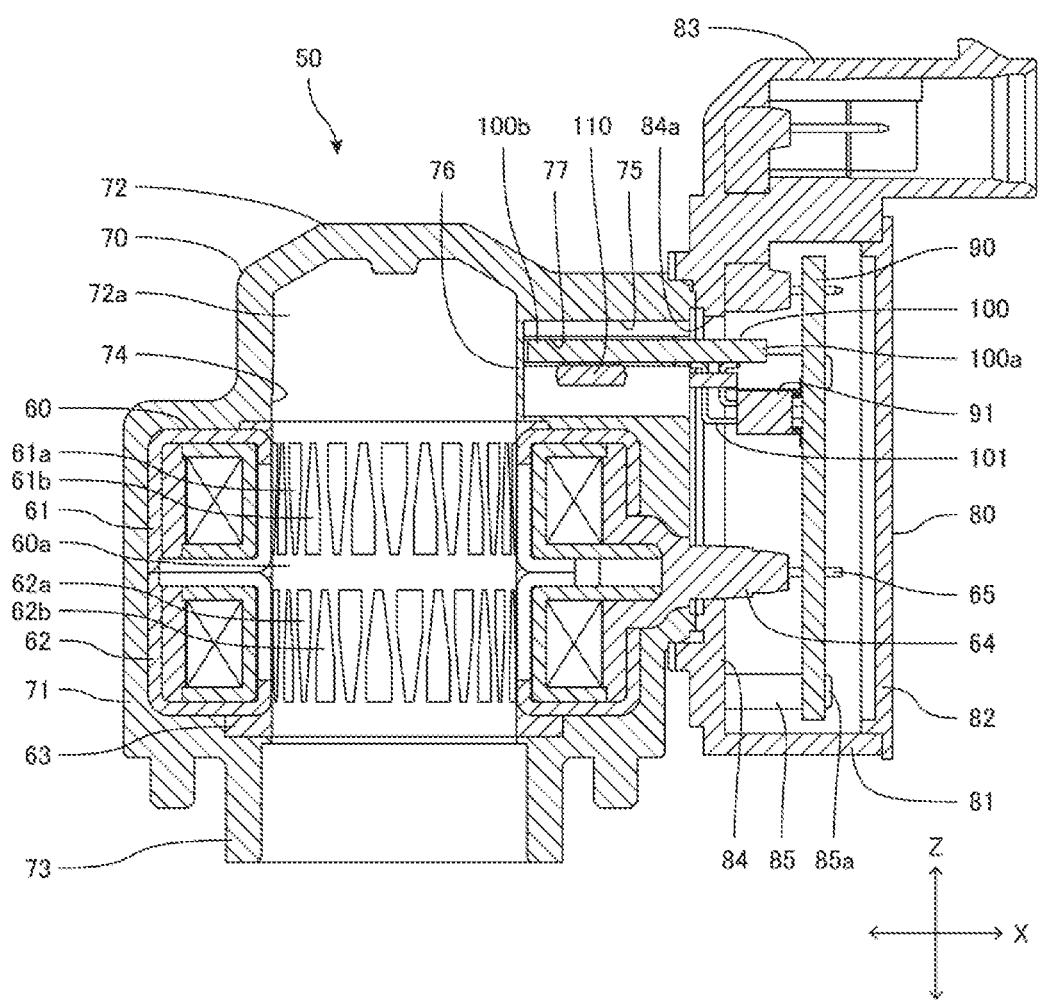
FIG. 2 is a sectional view of a stator unit of the electric valve in FIG. 1.
Figure 3:
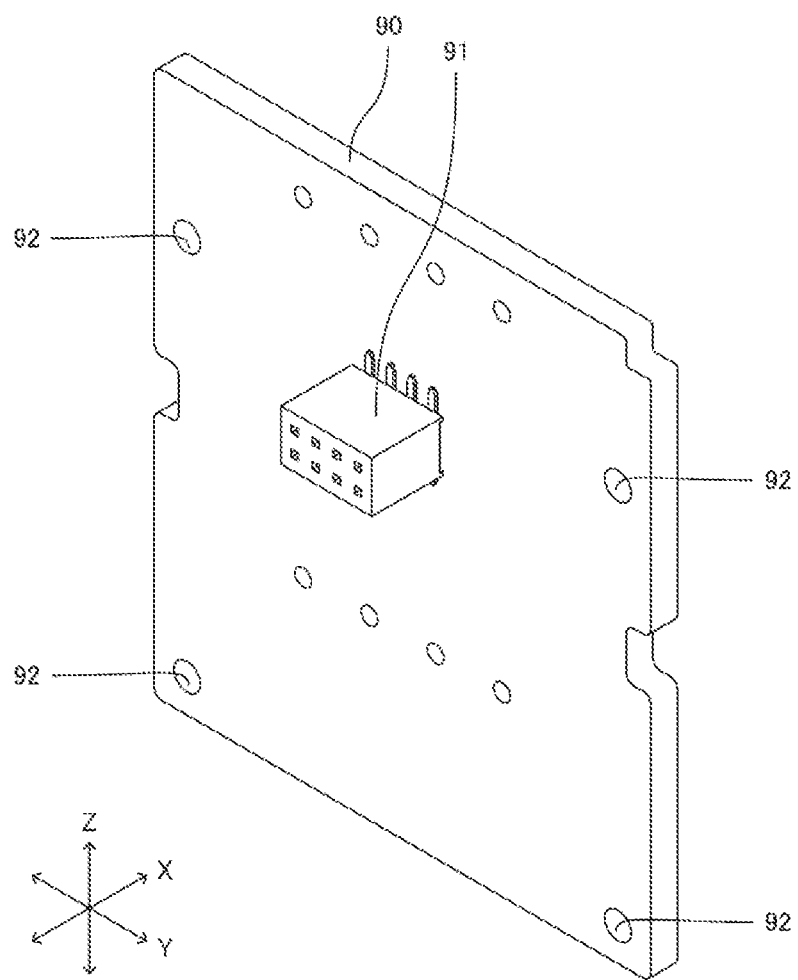
FIG. 3 is a perspective view of a main circuit board of the electric valve in FIG. 1.
Figure 4:
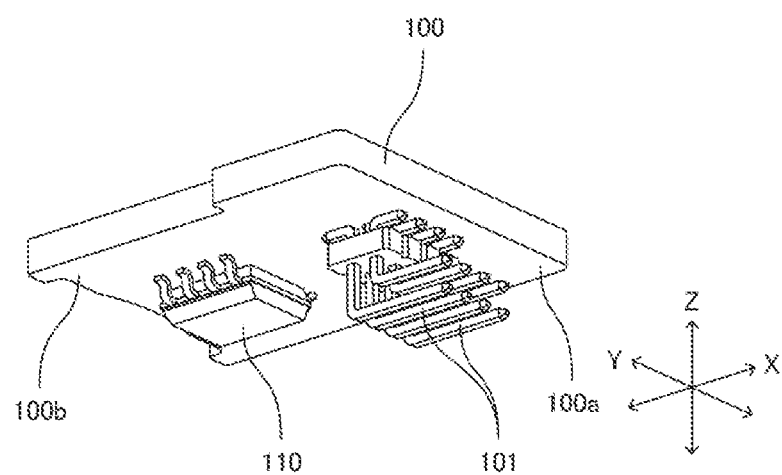
FIG. 4 is a perspective view of a sub circuit board of the electric valve in FIG. 1.
Figure 5:
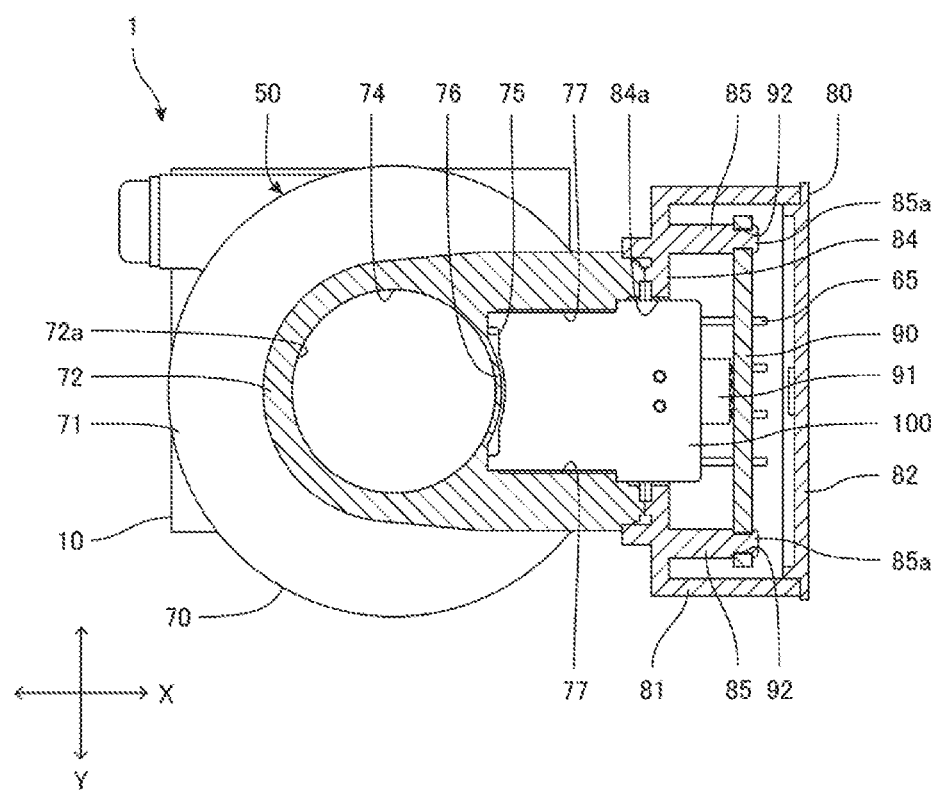
FIG. 5 is a sectional view taken along line V-V of FIG. 1.
Figure 6:
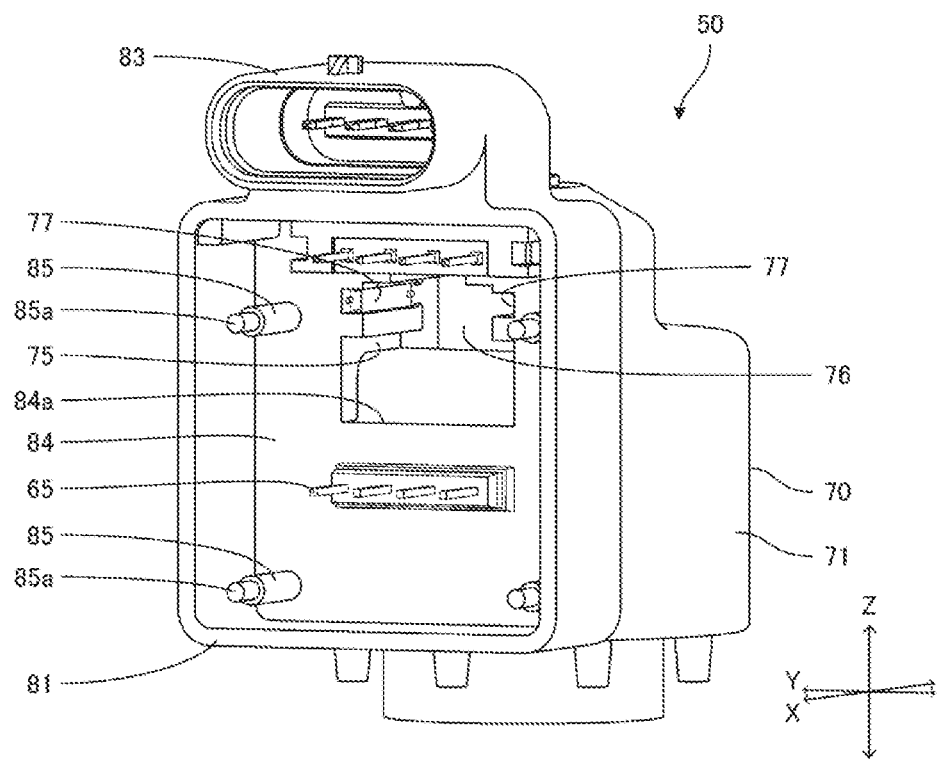
FIG. 6 is a perspective view of the stator unit in FIG. 2 during assembly.
Figure 7:
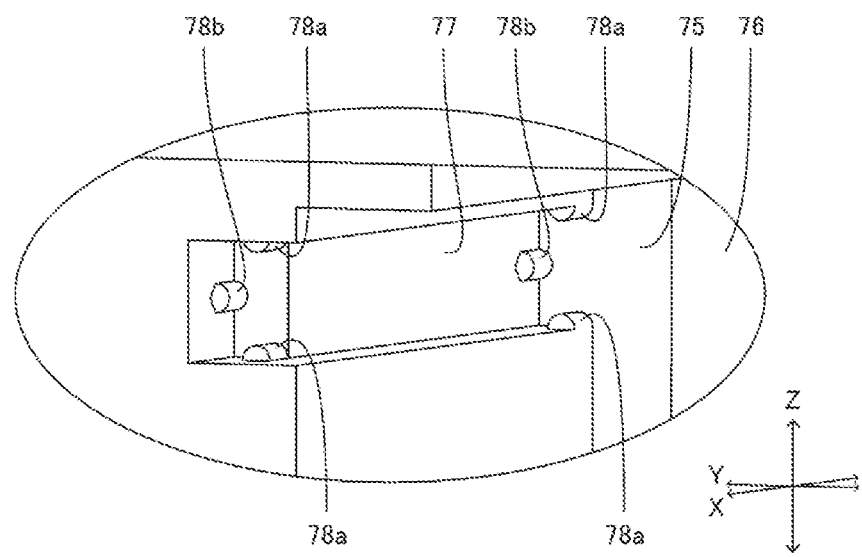
FIG. 7 is an enlarged perspective view of a part of FIG. 6.
Figure 8:
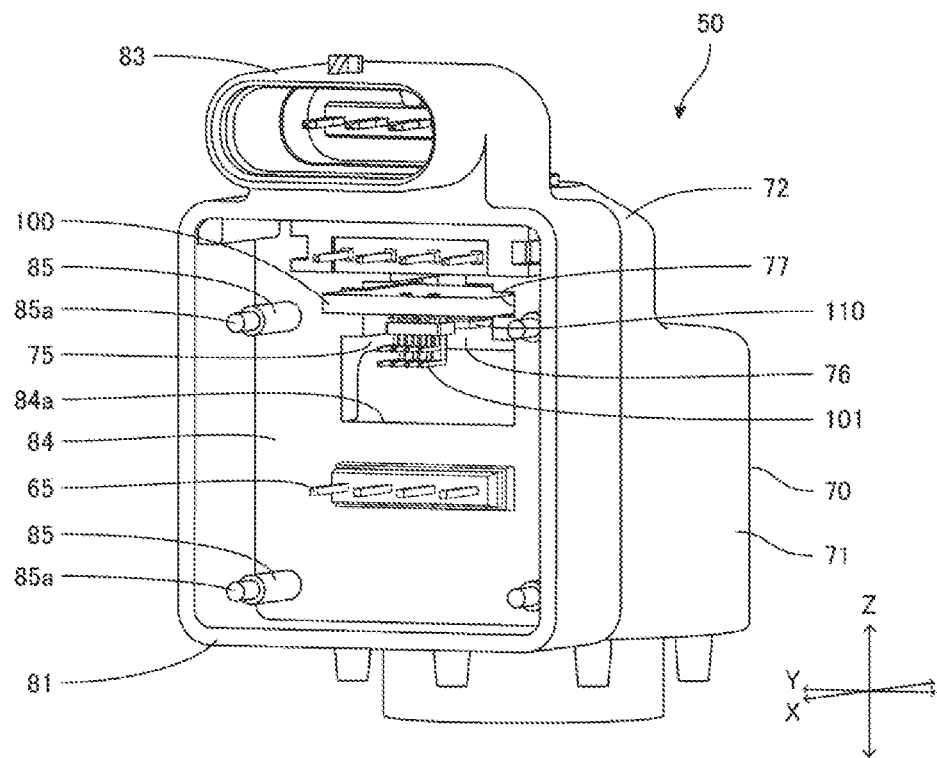
FIG. 8 is another perspective view of the stator unit in FIG. 2 during assembly.
Figure 9:
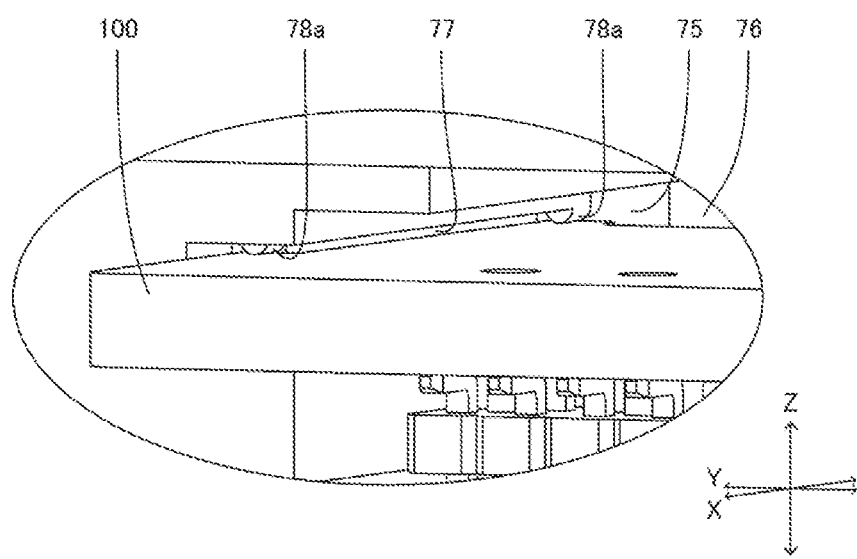
FIG. 9 is an enlarged perspective view of a part of FIG. 8.

FIG. 1 is a sectional view of an electric valve according to the first embodiment of the present invention. FIG. 2 is a sectional view of a stator unit of the electric valve in FIG. 1. FIG. 3 is a perspective view of a main circuit board of the electric valve in FIG. 1. FIG. 4 is a perspective view of a sub circuit board of the electric valve in FIG. 1. FIG. 5 is a sectional view taken along line V-V of FIG. 1. In FIG. 5, members disposed in an inner space of the stator unit are omitted. FIG. 6 is a perspective view of the stator unit in FIG. 2 during assembly. FIG. 7 is an enlarged perspective view of a part of FIG. 6. FIG. 6 and FIG. 7 illustrate the stator unit before the sub circuit board is located in a sub circuit board space of the housing. FIG. 8 is another perspective view of the stator unit in FIG. 2 during assembly. FIG. 9 is an enlarged perspective view of a part of FIG. 8. FIG. 8 and FIG. 9 illustrate the stator unit after the sub circuit board is located in the sub circuit board space of the housing. In each figure, an X direction indicated by the arrow X is a left-and-right direction (a lateral direction), a Y direction indicated by the arrow Y is a front-and-back direction, and a Z direction indicated by the arrow Z is an up-and-down direction. A direction with the letter "X" on the arrow X is a right direction, a direction with the letter "Y" on the arrow Y is a front direction, and a direction with the letter "Z" on the arrow Z is an upward direction.

As illustrated in the figures, an electric valve 1 includes a valve body 10, a can 20, a driving section 30, a valve member 40, and a stator unit 50.

The valve body 10 is made of a metal such as an aluminum alloy. The valve body 10 includes a main body portion 11, a circular cylindrical portion 12, and a flange portion 13. The main body portion 11 has a rectangular parallelepiped shape. The circular cylindrical portion 12 projects from the upper surface of the main body portion 11. The circular cylindrical portion 12 is mounted on the main body portion 11 by a screw structure. A valve chamber 14 and flow channels 15 and 16 are provided in the main body portion 11. The flow channel 15 is connected to the valve chamber 14. The flow channel 16 is connected to the valve chamber 14 via a port 17. The flange portion 13 has an annular plate-like shape. The inner peripheral edge of the flange portion 13 is bonded to the upper portion of the circular cylindrical portion 12.

The can 20 is made of a metal such as stainless steel. The can 20 has a circular cylindrical shape that is closed at the upper end. The lower end of the can 20 is bonded to the outer peripheral edge of the flange portion 13.

The driving section 30 moves the valve member 40 in the up-and-down direction (a direction of an axis L). The driving section 30 includes a magnet rotor 31, a valve stem holder 32, a guide bush 33, a valve stem 34, and a permanent magnet 38.

The magnet rotor 31 has a circular cylindrical shape. The outer diameter of the magnet rotor 31 is slightly smaller than the inner diameter of the can 20. Multiple N poles and multiple S poles are provided on the outer circumferential surface of the magnet rotor 31. The multiple N poles and multiple S poles extend in the up-and-down direction and are arranged alternately and circumferentially at equal intervals. In the present embodiment, the magnet rotor 31 includes 12 N poles and 12 S poles.

The valve stem holder 32 has a circular cylindrical shape that is closed at the upper end. A supporting ring 35 is fixed to the upper portion of the valve stem holder 32. The magnet rotor 31 and the valve stem holder 32 are coupled together by the supporting ring 35. The inner circumferential surface of the valve stem holder 32 has an internal thread 32c.

The guide bush 33 integrally includes a first circular cylindrical portion 33a and a second circular cylindrical portion 33b. The outer diameter of the second circular cylindrical portion 33b is smaller than the outer diameter of the first circular cylindrical portion 33a. The second circular cylindrical portion 33b is provided coaxially and continuously with the upper end of the first circular cylindrical portion 33a. The outer circumferential surface of the second circular cylindrical portion 33b has an external thread 33c. The external thread 33c is screwed into the internal thread 32c of the valve stem holder 32. The first circular cylindrical portion 33a is press-fitted into a fitting hole 12a that is provided in the circular cylindrical portion 12 of the valve body 10. The guide bush 33 is coupled to the valve body 10.

The valve stem 34 has a circular columnar shape. The valve stem 34 includes an upper portion 34a that extends through the valve stem holder 32. A push nut 36 as a retainer is attached to the upper portion 34a of the valve stem 34. The valve stem 34 is disposed in the guide bush 33 and the circular cylindrical portion 12. The lower portion of the valve stem 34 is disposed in the valve chamber 14. The valve stem 34 has a step portion 34b. The step portion 34b is an annular plane facing upward. A valve closing spring 37 is disposed between the valve stem holder 32 and the step portion 34b of the valve stem 34. The valve closing spring 37 is a compression coil spring. The valve closing spring 37 pushes the valve stem 34 downward.

The permanent magnet 38 is located above the magnet rotor 31 inside the can 20. The permanent magnet 38 has an annular flat plate-like shape. The permanent magnet 38 includes one N pole and one S pole that are disposed so as to face radially each other. The permanent magnet 38 is fixed to the supporting ring 35 via a fixing member 39. The permanent magnet 38 rotates together with the magnet rotor 31.

The valve member 40 is provided integrally and continuously with the lower end of the valve stem 34. The valve member 40 is disposed in the valve chamber 14. The driving section 30 moves the valve member 40 in the up-and-down direction. The movement of the valve member 40 opens and closes the port 17.

The stator unit 50 includes a stator 60, a housing 70, and a case 80, a main circuit board 90, a sub circuit board 100, and a magnetic sensor 110.

The stator 60 has a circular cylindrical shape. The stator 60 and the magnet rotor 31 are members of a stepping motor. The stator 60 includes an upper stator 61, a lower stator 62, and a mold 63 that is made of synthetic resin.

The upper stator 61 is disposed coaxially on the lower stator 62. The upper stator 61 includes multiple claw-pole-type pole teeth 61a and 61b that are arranged circumferentially at equal intervals. The lower stator 62 includes multiple claw-pole-type pole teeth 62a and 62b that are arranged circumferentially at equal intervals. In this embodiment, the upper stator 61 includes 12 pole teeth 61a and 12 pole teeth 61b. The lower stator 62 includes 12 pole teeth 62a and 12 pole teeth 62b. The tip ends of the pole teeth 61a and 62a point downward, and the tip ends of the pole teeth 61b and 62b point upward. One pole tooth 62a is located in the center position between the pole teeth 61a and 61b adjacent to each other when viewed in the direction of the axis L. One pole tooth 62b is located in the center position between the pole teeth 61a and 61b adjacent to each other when viewed in the direction of the axis L. When the upper stator 61 is energized, the pole teeth 61a and the pole teeth 61b have mutually opposite polarities. When the lower stator 62 is energized, the pole teeth 62a and the pole teeth 62b have mutually opposite polarities. The mold 63 fills the upper stator 61 and the lower stator 62. The mold 63 and the pole teeth 61a, 61b, 62a, and 62b form an inner circumferential surface 60a of the stator 60. The diameter of the inner circumferential surface 60a of the stator 60 is equal to the diameter of the outer circumferential surface of the can 20. The mold 63 includes a terminal supporting portion 64.

The terminal supporting portion 64 extends from the upper stator 61 and the lower stator 62 in the lateral direction. The terminal supporting portion 64 supports multiple terminals 65. The terminals 65 extend from the tip end of the terminal supporting portion 64 in the lateral direction. The terminals 65 are connected to a coil of the upper stator 61 and a coil of the lower stator 62.

The housing 70 is made of synthetic resin. The housing 70 is formed by injection molding. The housing 70 houses the stator 60. The housing 70 may be formed by integrally molding (insert molding) with the stator 60. The stator 60 and the housing 70 may be manufactured separately, and the stator 60 may be fitted inside the housing 70. The housing 70 integrally includes a peripheral wall portion 71, a dome portion 72, and a tubular portion 73.

The peripheral wall portion 71 has a circular cylindrical shape. The stator 60 is disposed inside the peripheral wall portion 71. The dome portion 72 has a circular cylindrical shape that is closed at the upper end. The outer diameter of the dome portion 72 is smaller than the outer diameter of the peripheral wall portion 71. The dome portion 72 is provided continuously with the upper end of the peripheral wall portion 71. The dome portion 72 has an inner circumferential surface 72a (that is, the inner circumferential surface of the housing 70) that has a diameter equal to the diameter of the inner circumferential surface 60a of the stator 60. The inner circumferential surface 72a of the dome portion 72 continues to the inner circumferential surface 60a of the stator 60. The inner circumferential surface 72a of the dome portion 72 and the inner circumferential surface 60a of the stator 60 form an inner space 74 of the stator unit 50. The can 20 is inserted into the inner space 74, and the stator 60 is disposed on the outer circumferential surface of the can 20. The tubular portion 73 has a circular cylindrical shape. The outer diameter of the tubular portion 73 is smaller than the outer diameter of the peripheral wall portion 71. The tubular portion 73 is provided continuously with the lower end of the peripheral wall portion 71. The tubular portion 73 is disposed such that the tubular portion 73 encloses the circular cylindrical portion 12 of the valve body 10. The tubular portion 73 and the circular cylindrical portion 12 form a gap in which a seal 18 in an annular shape is disposed. The seal 18 is made of an elastic material such as a rubber material. The seal 18 inhibits water from entering the inner space 74.

The housing 70 includes a sub circuit board space 75. The sub circuit board space 75 extends in the lateral direction and opens to the side surface of the housing 70. The sub circuit board space 75 is located adjacent to the inner space 74. A partition wall 76 is disposed between the inner space 74 and the sub circuit board space 75. The partition wall 76 separates the sub circuit board space 75 from the inner space 74. As illustrated in FIG. 5, the cross section of the partition wall 76 has an arc shape along the outer circumferential surface of the can 20.

Two press-fit grooves 77 are provided on the inner surface of the sub circuit board space 75. The press-fit grooves 77 extend in the lateral direction. The press-fit grooves 77 are disposed so as to face each other in the front-and-back direction. Multiple projections 78 are provided on each of the inner surfaces of the press-fit grooves 77. Some projections 78 of the multiple projections 78 (projections 78a in FIG. 7) are disposed so as to face each other in the up-and-down direction. Other projections 78 of the multiple projections 78 (projections 78b of one press-fit groove 77 in FIG. 7 and projections 78b of the other press-fit groove 77 not illustrated) are disposed so as to face each other in the front-and-back direction. The projections 78 are compressed and elastically deformed when the sub circuit board 100 is press-fitted into the press-fit grooves 77. The multiple projections 78 press the sub circuit board 100, which is press-fitted into the press-fit grooves 77, in the up-and-down direction and the front-and-back direction and support the sub circuit board 100.

The case 80 is made of synthetic resin. The case 80 is formed by injection molding. The case 80 is located laterally adjacent to the housing 70. The case 80 includes a case body 81, a lid body 82, and a connector 83. The case body 81 has a rectangular parallelepiped box shape with an opening on the side. The lid body 82 has a flat plate-like shape. The lid body 82 is disposed so as to close the opening on the side of the case body 81. The connector 83 has an elliptical cylindrical shape. The connector portion 83 extends from the case body 81 in the lateral direction (right direction). The case body 81 and the connector 83 are integrally formed.

The case body 81 includes a side wall portion 84. The side wall portion 84 has a flat plate-like shape. The side wall portion 84 is disposed so as to face the lid body 82 in the lateral direction. The side wall portion 84 has a case opening 84a in a quadrangular shape. The case opening 84a is connected to the sub circuit board space 75 of the housing 70. The peripheral edge portion of the case opening 84a on the side wall portion 84 is bonded to the housing 70. In addition, the case body 81 includes multiple supporting columns 85. The supporting columns 85 have a circular columnar shape. The supporting columns 85 extend from the side wall portion 84 in the lateral direction (right direction). Tip ends 85a of the supporting columns 85 point in a direction away from the inner space 74.

The main circuit board 90 is a printed circuit board on which electronic components are mounted. The main circuit board 90 has a flat plate-like shape. The main circuit board 90 is housed in the case 80. The main circuit board 90 is disposed parallel to the front-and-back direction and the up-and-down direction. The main circuit board 90 includes a surface facing the inner space 74 on which a circuit board connector 91 is disposed. A microcomputer, not illustrated, is mounted on the main circuit board 90. The microcomputer functions as a calculation device that calculates a signal output from the magnetic sensor 110. The main circuit board 90 has penetrating holes 92 corresponding to each of the multiple supporting columns 85. The tip ends 85a of the supporting columns 85 are inserted into the penetrating holes 92. Then, the tip ends 85a of the supporting columns 85 are deformed to enlarge the diameters thereof beyond the diameters of the penetrating holes 92 by infrared caulking or the like. The main circuit board 90 is supported by the supporting columns 85. The terminals 65 of the stator 60 are connected to the main circuit board 90.

The sub circuit board 100 is a printed circuit board on which electronic components are mounted. The sub circuit board 100 has a flat plate-like shape. The sub circuit board 100 is disposed in the sub circuit board space 75 of the housing 70. The sub circuit board 100 is disposed parallel to the lateral direction and the front-and-back direction. Both edges of the sub circuit board 100 that are opposite to each other in the front-and-back direction are press-fitted into the press-fit grooves 77. The sub circuit board 100 is interposed by the projections 78 of the press-fit grooves 77 in the up-and-down direction and the front-and-back direction. The sub circuit board 100 is disposed at a right angle (including generally a right angle) to the main circuit board 90. The sub circuit board 100 includes a first end 100a that is located near the main circuit board 90. The sub circuit board 100 includes a second end 100b that is located near the partition wall 76 of the housing 70 (that is, near the inner space 74). The first end 100a and the second end 100b are opposite to each other in the left-and-right direction. The sub circuit board 100 extends from near the main circuit board 90 to near the inner space 74. A portion in the second end 100b facing the partition wall 76 has an arc shape along the partition wall 76. As a result, the sub circuit board 100 can be located closer to the partition wall 76, and the distance between the magnet rotor 31 and the magnetic sensor 110 that is mounted on the sub circuit board 100 can be shortened.

Circuit board terminals 101 are located at the first end 100a of the sub circuit board 100. The circuit board terminals 101 are connected to the circuit board connector 91 of the main circuit board 90. The sub circuit board 100 is connected to the main circuit board 90 via the circuit board terminals 101 and the circuit board connector 91. The circuit board terminals 101 may be disposed on the main circuit board 90, and the circuit board connector 91 may be disposed on the sub circuit board 100.

The magnetic sensor 110 is a rotational angle sensor. The magnetic sensor 110 has a surface-mount package. The magnetic sensor 110 is located at the second end 100b of the sub circuit board 100. The magnetic sensor 110 is located closer to the inner space 74 than the circuit board terminals 101 is. The magnetic sensor 110 is located so as to face the permanent magnet 38 in the lateral direction with the can 20 and the partition wall 76 in between. The magnetic sensor 110 senses a magnetic field generated by the permanent magnet 38 and outputs the signal corresponding to a rotational angle of the permanent magnet 38.

In the electric valve 1, the respective axes of the circular cylindrical portion 12 of the valve body 10, the port 17, the can 20, the magnet rotor 31, the valve stem holder 32, the guide bush 33, the valve stem 34, the valve member 40, the inner space 74 of the stator unit 50, the stator 60 (the upper stator 61 and the lower stator 62), and the housing 70 (the peripheral wall portion 71 and the tubular portion 73) are aligned with the axis L.

The operation of the electric valve 1 is described below.

In the electric valve 1, the upper stator 61 and the lower stator 62 are energized to rotate the magnet rotor 31 in one direction. The valve stem holder 32 rotates together with the magnet rotor 31. A screw-feed action between the internal thread 32c of the valve stem holder 32 and the external thread 33c of the guide bush 33 moves the valve stem holder 32 downward. The valve stem 34 moves downward together with the valve stem holder 32, and the valve member 40 closes the port 17 (a valve-closing state).

In the electric valve 1, the upper stator 61 and the lower stator 62 are energized to rotate the magnet rotor 31 in the other direction. The valve stem holder 32 rotates together with the magnet rotor 31. The screw-feed action between the internal thread 32c of the valve stem holder 32 and the external thread 33c of the guide bush 33 moves the valve stem holder 32 upward. The valve stem 34 moves upward together with the valve stem holder 32, and the valve member 40 opens the port 17 (a valve-opening state).

The permanent magnet 38 rotates together with the magnet rotor 31 inside the can 20. The magnetic sensor 110 is located near the inner space 74 in which the can 20 is disposed. The magnetic sensor 110 outputs the signal corresponding to the rotational angle of the permanent magnet 38. The signal output from the magnetic sensor 110 is sent from the sub circuit board 100 to the main circuit board 90 via the circuit board terminals 101 and the circuit board connector 91. The microcomputer mounted on the main circuit board 90 calculates an opening degree of the port 17 or the like based on the signal output from the magnetic sensor 110.

A method for assembling the electric valve 1 is described below.

The stator unit 50 is assembled. First, the stator 60 is installed in a housing mold, and the housing 70 is formed by injection molding such that the stator 60 and the housing 70 are integrated. A terminal component of the connector 83 is installed in a case mold, and the case body 81 and the connector 83 are formed by injection molding such that the case body 81, the connector 83 and the terminal component are integrated. The lid body 82 is formed by injection molding. As illustrated in FIG. 6, the side wall portion 84 of the case body 81 is bonded to the housing 70 by ultrasonic welding or infrared welding, and the sub circuit board space 75 and the case opening 84a are connected. As illustrated in FIG. 8, the sub circuit board 100 is inserted into the sub circuit board space 75 through the case opening 84a. At this time, both the edges of the sub circuit board 100 that are opposite to each other in the front-and-back direction are press-fitted into the press-fit grooves 77. As a result, the sub circuit board 100 is supported by the press-fit grooves 77. The sub circuit board 100 is disposed across the case 80 and the sub circuit board space 75. As the circuit board terminals 101 of the sub circuit board 100 are connected to the circuit board connector 91 of the main circuit board 90, the tip ends 85a of the supporting columns 85 are inserted into the penetrating holes 92 of the main circuit board 90. The tip ends 85a of the supporting columns 85 are deformed and enlarged by infrared caulking. As a result, the main circuit board 90 is supported by the supporting columns 85. The terminals 65 of the stator 60 are soldered to the main circuit board 90. The lid body 82 is bonded to the case body 81, and the stator unit 50 is completed.

A valve body assembly is manufactured by combining the valve body 10, the can 20, the driving section 30, and the valve member 40 in a process separate from the assembling process for the stator unit 50. Then, the can 20 is inserted into the inner space 74 of the stator unit 50, the stator unit 50 is fixed to the valve body 10, and the electric valve 1 is completed.

As described above, the electric valve 1 includes the valve body 10, the can 20 that is bonded to the valve body 10, the magnet rotor 31 that is disposed inside the can 20, and the stator unit 50 that includes the inner space 74 in which the can 20 is disposed. The stator unit 50 includes the housing 70, the stator 60 in the circular cylindrical shape that is housed in the housing 70, the main circuit board 90 in the flat plate-like shape that is disposed parallel to the up-and-down direction, the sub circuit board 100 in the flat plate-like shape that is disposed at a right angle to the main circuit board 90, and the magnetic sensor 110 that is mounted on the sub circuit board 100. The housing 70 includes the sub circuit board space 75 that is located adjacent to the inner space 74. The first end 100a of the sub circuit board 100 is connected to the main circuit board 90 via the circuit board terminals 101. The second end 100b of the sub circuit board 100 is located near the inner space 74 in the sub circuit board space 75. The magnetic sensor 110 is located at the second end 100b of the sub circuit board 100.

In the electric valve 1, the sub circuit board 100 is disposed at a right angle to the main circuit board 90, and the second end 100b of the sub circuit board 100 is located near the inner space 74. The magnetic sensor 110 is located at the second end 100b of the sub circuit board 100. Therefore, the magnetic sensor 110 can be located near the can 20. The main circuit board 90 is disposed parallel to the up-and-down direction, which reduces both the shape in plan view and the height dimension of the electric valve 1. The electronic components are shared by and mounted on the main circuit board 90 and the sub circuit board 100, allowing the main circuit board 90 to be decreased in size. Therefore, the magnetic sensor 110 can be located near the can 20, and the electric valve 1 can be decreased in size.

In addition, the housing 70 includes the partition wall 76 that separates the sub circuit board space 75 from the inner space 74. This configuration inhibits electrostatic discharge from the can 20 to the sub circuit board 100. This configuration prevents water entered into the inner space 74 from entering the sub circuit board space 75.

In addition, the housing 70 includes the press-fit grooves 77 into which the sub circuit board 100 is press-fitted. With this configuration, the sub circuit board 100 can be supported by the housing 70. As a result, a separate member to support the sub circuit board 100 can be omitted.

In addition, the press-fit grooves 77 have the inner surface on which the projections 78 are provided, and the projections 78 are in the elastically deformed shape when the sub circuit board 100 is press-fitted into the press-fit grooves 77. With this configuration, the projections 78 press the sub circuit board 100, and the sub circuit board 100 can be more securely supported.

In addition, the electric valve 1 includes the permanent magnet 38 that rotates together with the magnet rotor 31. The magnetic sensor 110 is located so as to sense the magnetic field generated by the permanent magnet 38. With this configuration, the permanent magnet 38 generates a stronger magnetic field than the magnet rotor 31, allowing the sensing range of the magnetic sensor 110 for the magnetic field to be further extended. As a result, a limitation on a location of the magnetic sensor 110 can be relaxed.

The electric valve 1 has a configuration in which the sub circuit board 100 is disposed perpendicular to the up-and-down direction, but may also have a configuration in which the sub circuit board 100 is disposed parallel to the up-and-down direction. Among various surface-mount package type magnetic sensors, a magnetic sensor with a magneto-sensitive surface on the upper surface of the package (a surface of the package of the magnetic sensor parallel to a circuit board on which the magnetic sensor is mounted) is relatively inexpensive. The sub circuit board 100 is disposed parallel to the up-and-down direction, allowing the upper surface of the package of the magnetic sensor 110 mounted on the sub circuit board 100 to face the outer circumferential surface of the can 20. As a result, the relatively inexpensive magnetic sensor 110 can be employed in the electric valve 1, and the component cost of the electric valve 1 can be reduced.

Second Embodiment

An electric valve 1A according to a second embodiment of the present invention is illustrated below with reference to FIG. 10 to FIG. 14.

Figure 10:
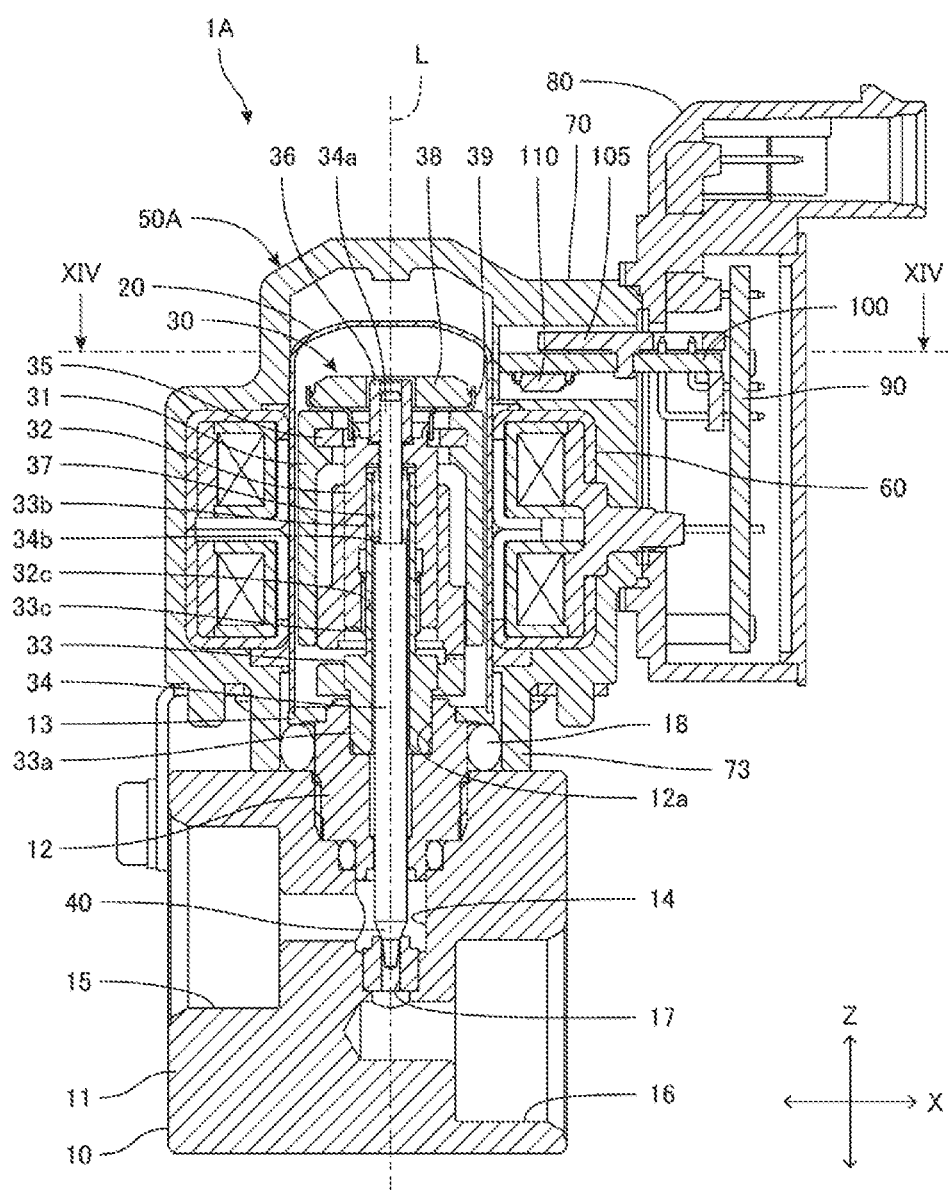
FIG. 10 is a sectional view of an electric valve according to a second embodiment of the present invention.
Figure 11:
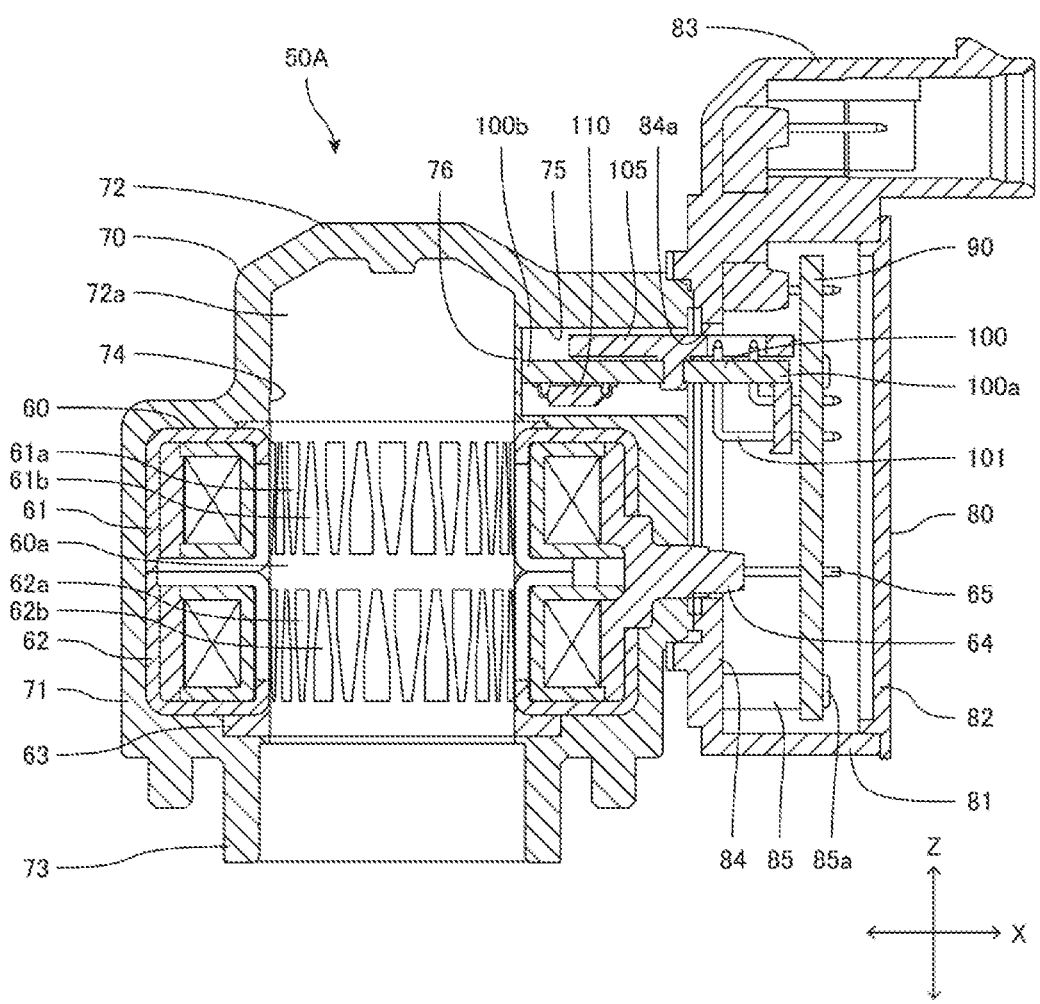
FIG. 11 is a sectional view of a stator unit of the electric valve in FIG. 10.
Figure 12:
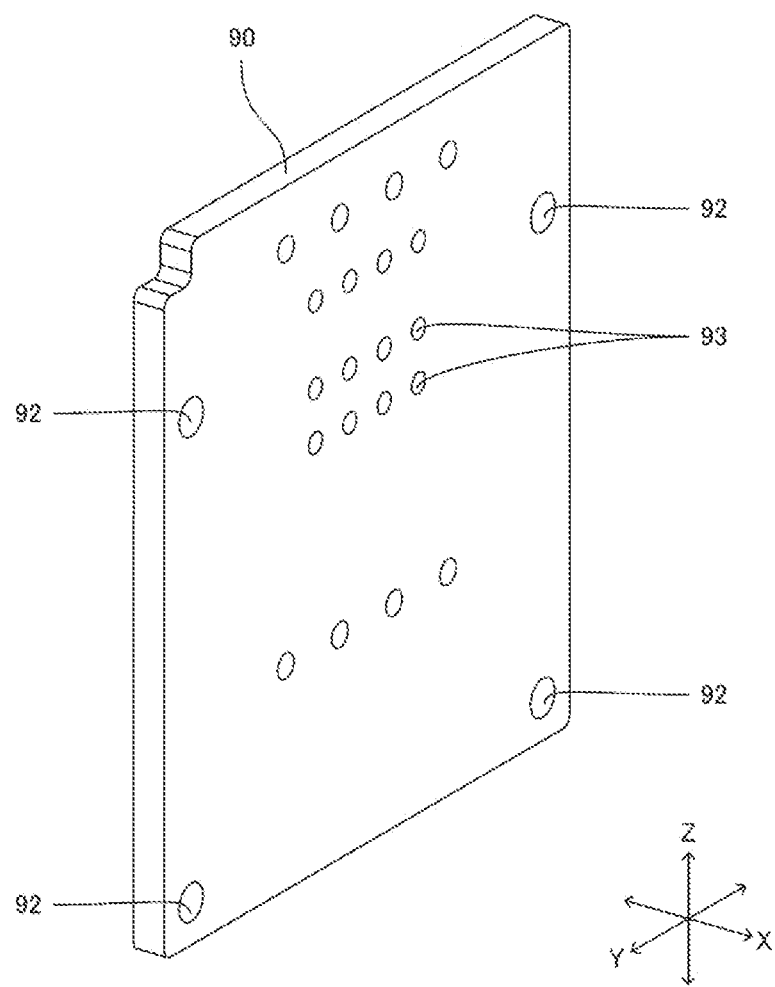
FIG. 12 is a perspective view of a main circuit board of the electric valve in FIG. 10.
Figure 13:
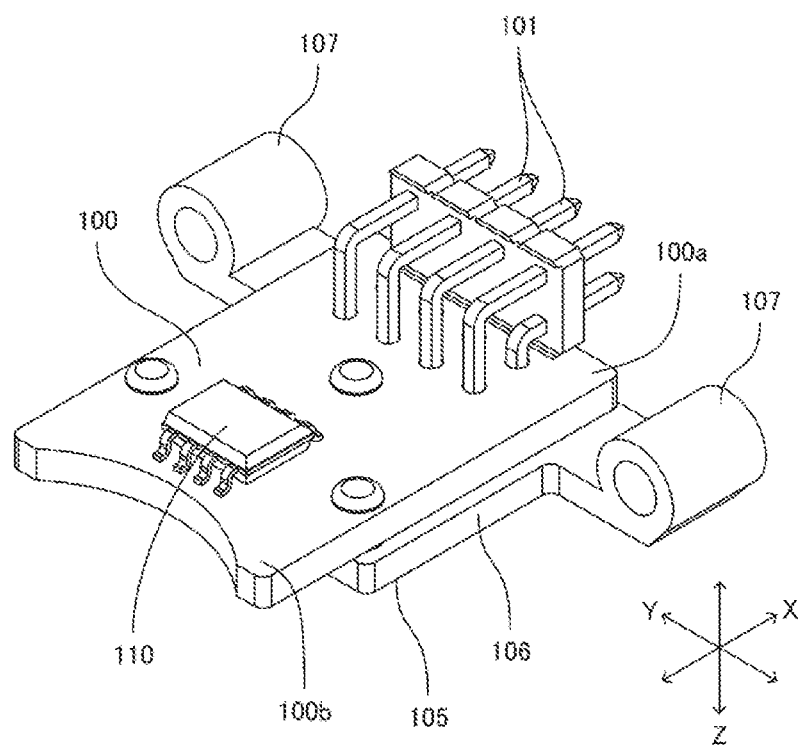
FIG. 13 is a perspective view of a sub circuit board and a sub circuit board supporting member of the electric valve in FIG. 10.
Figure 14:
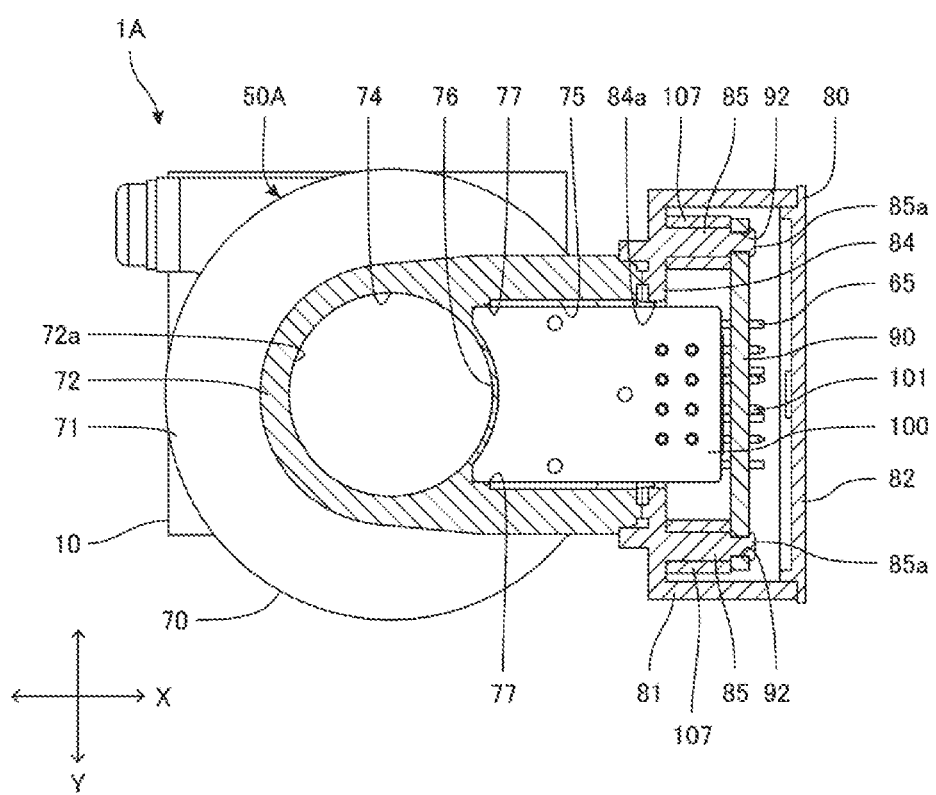
FIG. 14 is a sectional view taken along line XIV-XIV of FIG. 10.

FIG. 10 is a sectional view of an electric valve according to the second embodiment of the present invention. FIG. 11 is a sectional view of a stator unit of the electric valve in FIG. 10. FIG. 12 is a perspective view of a main circuit board of the electric valve in FIG. 10. FIG. 13 is a perspective view of a sub circuit board and a sub circuit board supporting member of the electric valve in FIG. 10. FIG. 14 is a sectional view taken along line XIV-XIV of FIG. 10. In FIG. 14, members disposed in an inner space of the stator unit are omitted. In the description below, elements having the same (including substantially the same) configurations as those of the electric valve 1 according to the first embodiment are denoted by the same reference signs as those of the electric valve 1, and detailed descriptions of these elements are omitted.

As illustrated in the figures, an electric valve 1A includes a valve body 10, a can 20, a driving section 30, a valve member 40, and a stator unit 50A. The stator unit 50A includes a stator 60, a housing 70, and a case 80, a main circuit board 90, a sub circuit board 100, a sub circuit board supporting member 105, and a magnetic sensor 110. The main circuit board 90 has, instead of the circuit board connector 91, through holes 93 into which circuit board terminals 101 are inserted.

The sub circuit board supporting member 105 includes a flat plate portion 106 and two mounting portions 107. The flat plate portion 106 is fixed to the sub circuit board 100. The flat plate portion 106 is disposed on and overlaps the upper surface of the sub circuit board 100. The flat plate portion 106 is disposed across the case 80 and a sub circuit board space 75 together with the sub circuit board 100. The mounting portions 107 have a circular cylindrical shape. The inner diameters of the mounting portions 107 are equal to the diameters of supporting columns 85 of the case 80. One mounting portion 107 is provided continuously with one of two edges of the flat plate portion 106 in a front-and-back direction, while the other mounting portion is provided continuously with the other of the two edges. Two mounting portions 107 are interposed between a side wall portion 84 of a case body 81 and the main circuit board 90. The sub circuit board supporting member 105 supports the sub circuit board 100. The stator unit 50A includes the sub circuit board supporting member 105, allowing the sub circuit board 100 to be more securely supported.

A method for assembling the stator unit 50A is described below.

The method for assembling the stator unit 50A includes the same processes as those of the method for assembling the stator unit 50 of the first embodiment, from forming the housing 70 by injection molding to bonding the case body 81 to the housing 70. The flat plate portion 106 of the sub circuit board supporting member 105 is fixed to the sub circuit board 100. As the supporting columns 85 are inserted into the mounting portions 107, the sub circuit board 100 and the flat plate portion 106 are inserted into the sub circuit board space 75 through a case opening 84a. At this time, both edges of the sub circuit board 100 that are opposite to each other in the front-and-back direction are press-fitted into press-fit grooves 77. In the present embodiment, only tips of both the edges in a second end 100b of the sub circuit board 100 are press-fitted into the press-fit grooves 77. As a result, the sub circuit board 100 is supported by the press-fit grooves 77. As the circuit board terminals 101 of the sub circuit board 100 are inserted into the through holes 93 of the main circuit board 90, tip ends 85a of the supporting columns 85 are inserted into penetrating holes 92 of the main circuit board 90. The tip ends 85a of the supporting columns 85 are deformed and enlarged by infrared caulking. As a result, the main circuit board 90 is supported by the supporting columns 85, and the mounting portions 107 are interposed between the side wall portion 84 and the main circuit board 90. The sub circuit board 100 is supported by the sub circuit board supporting member 105. Multiple terminals 65 of the stator 60 and the circuit board terminals 101 of the sub circuit board 100 are soldered to the main circuit board 90. A lid body 82 is bonded to the case body 81, and the stator unit 50A is completed.

The electric valve 1A has the effects similar to or the same as those of the electric valve 1 according to the first embodiment.

Third Embodiment

An electric valve 1B according to a third embodiment of the present invention is illustrated below with reference to FIG. 15 to FIG. 20.

Figure 15:
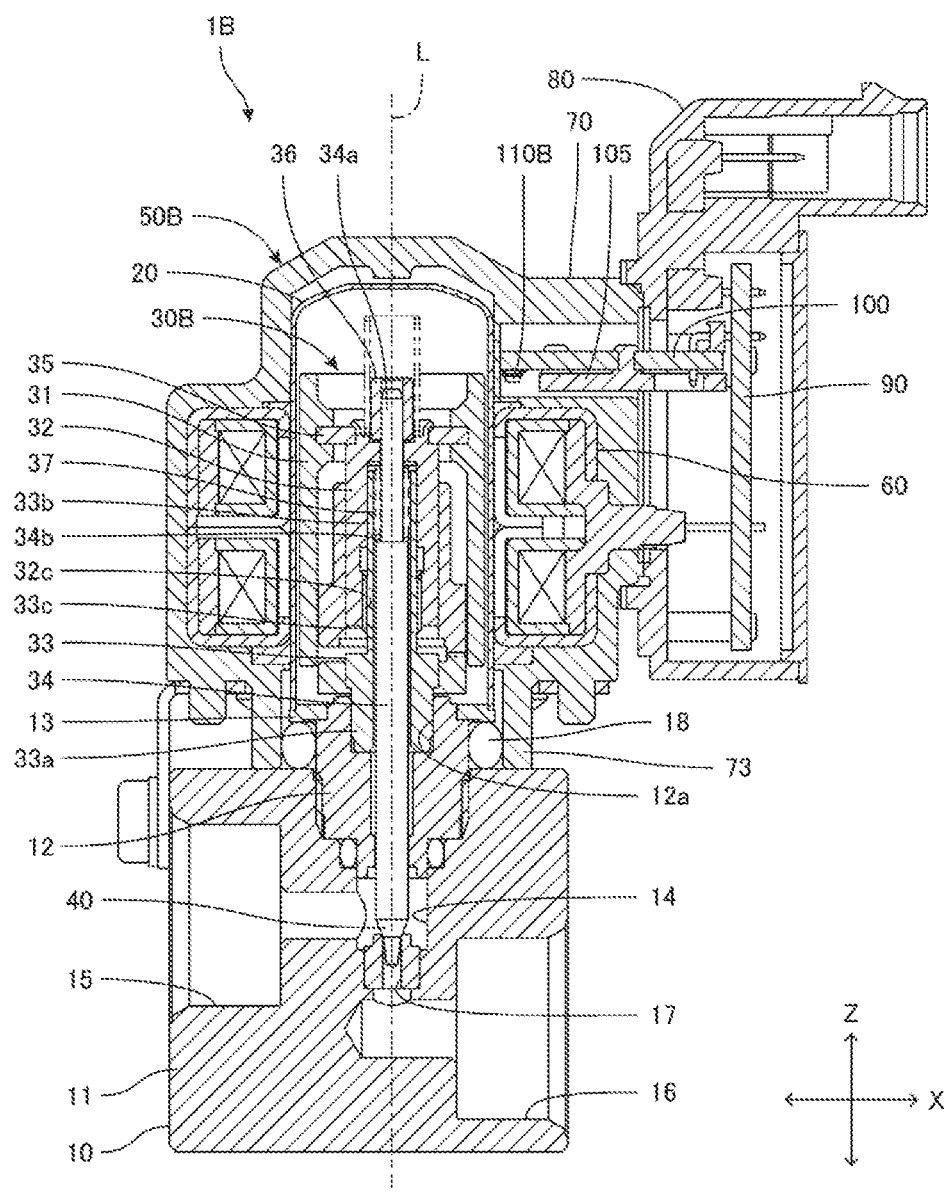
FIG. 15 is a sectional view of an electric valve according to a third embodiment of the present invention.
Figure 16:
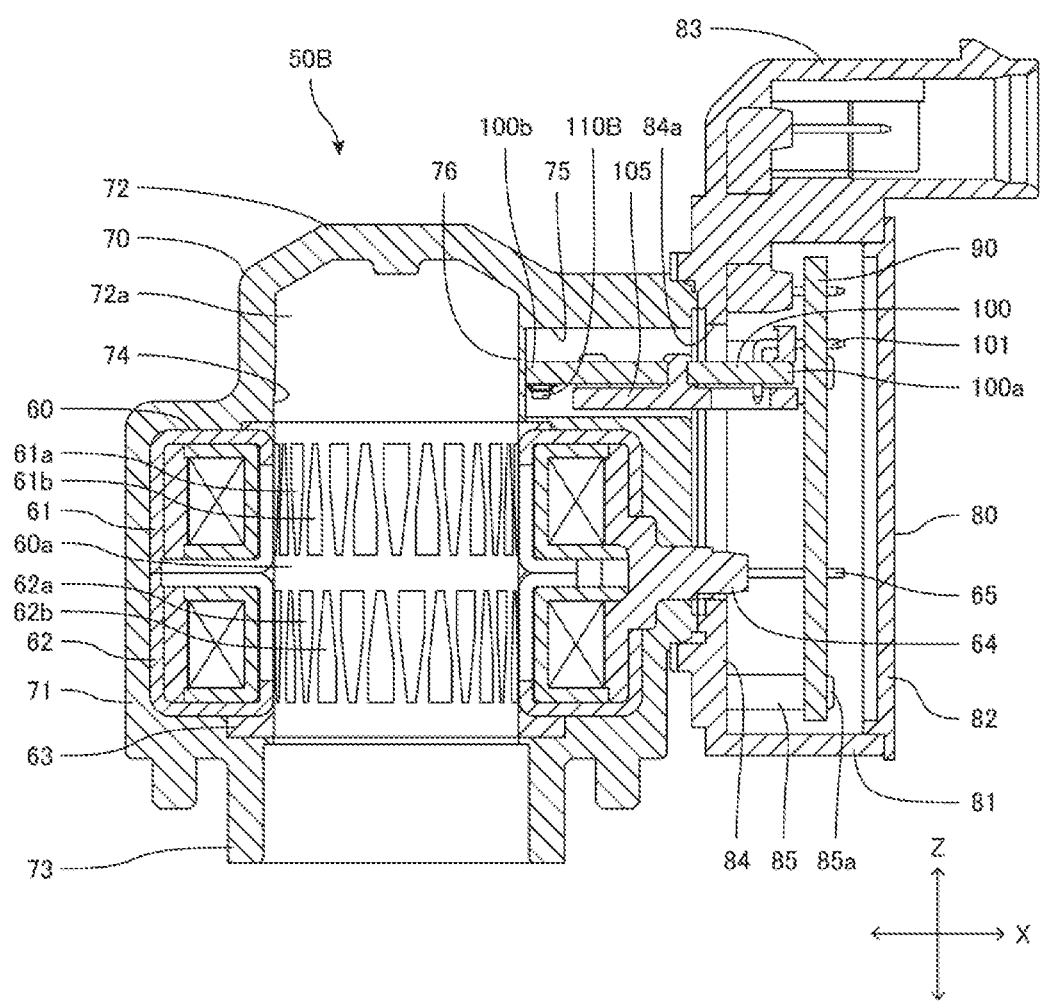
FIG. 16 is a sectional view of a stator unit of the electric valve in FIG. 15.
Figure 17:
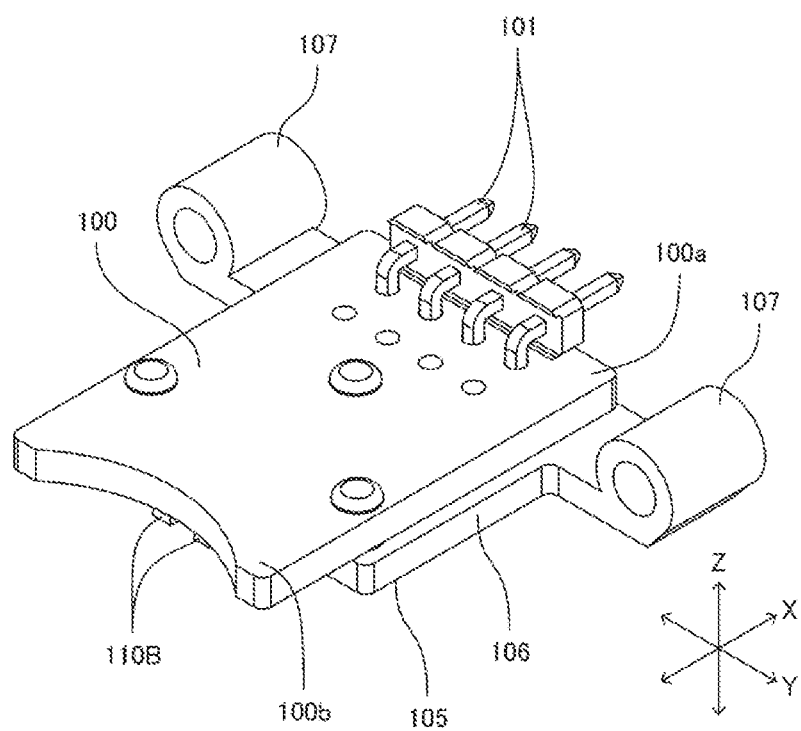
FIG. 17 is a perspective view of a sub circuit board and a sub circuit board supporting member of the electric valve in FIG. 15.
Figure 18:
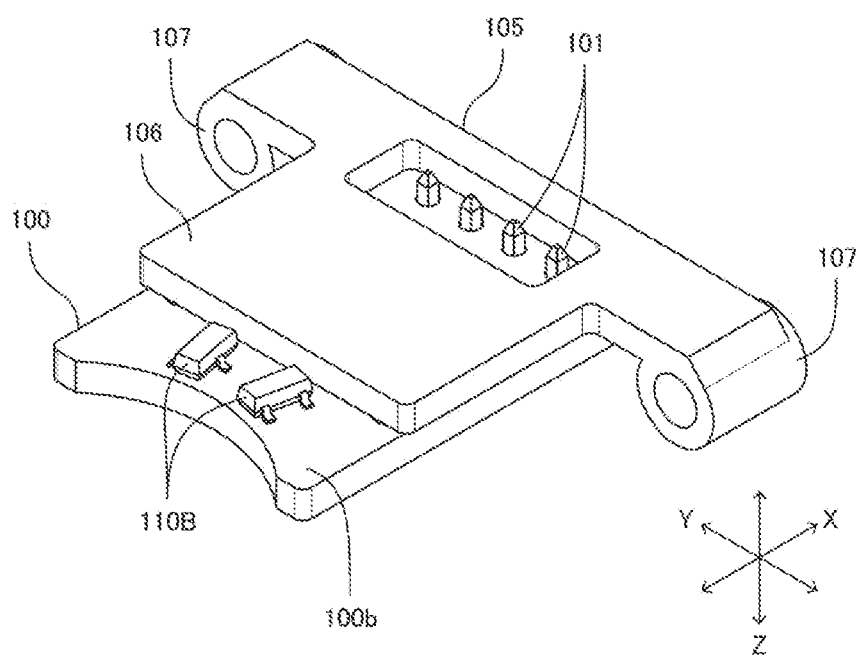
FIG. 18 is another perspective view of the sub circuit board and the sub circuit board supporting member of the electric valve in FIG. 15.
Figure 19:
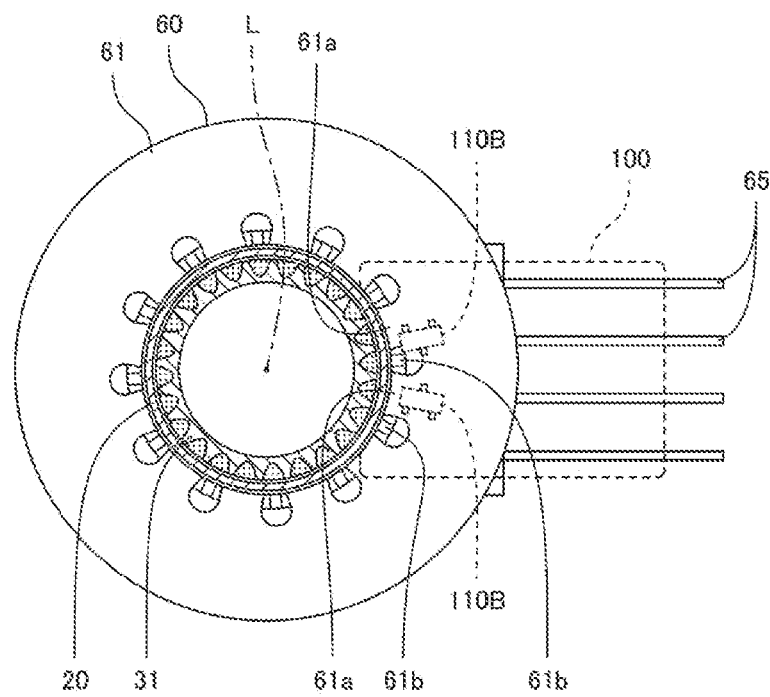
FIG. 19 is a diagram illustrating the positional relationship between pole teeth of a stator and two magnetic sensors of the electric valve in FIG. 15.
Figure 20:
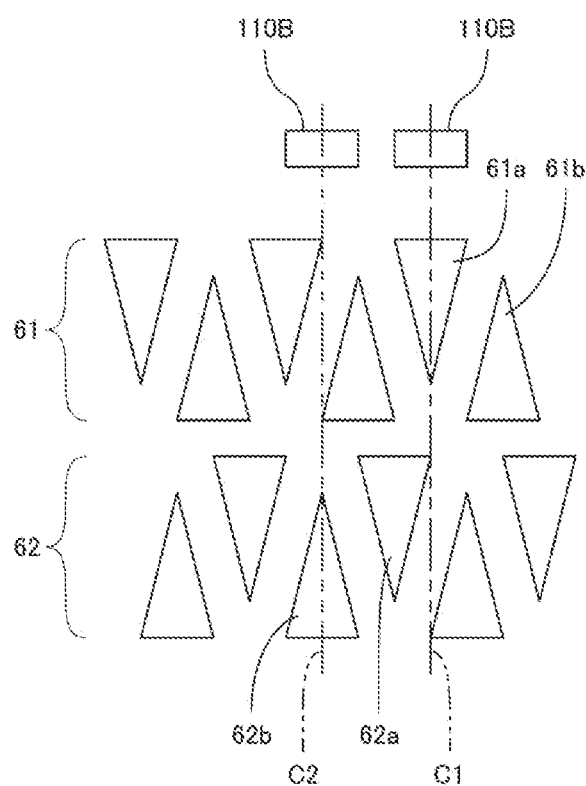
FIG. 20 is another diagram illustrating the positional relationship between the pole teeth of the stator and the two magnetic sensors of the electric valve in FIG. 15.

FIG. 15 is a sectional view of an electric valve according to the third embodiment of the present invention. FIG. 16 is a sectional view of a stator unit of the electric valve in FIG. 15. FIG. 17 and FIG. 18 are perspective views of a sub circuit board and a sub circuit board supporting member of the electric valve in FIG. 15. FIG. 19 and FIG. 20 are diagrams illustrating the positional relationship between pole teeth of a stator and two magnetic sensors of the electric valve in FIG. 15. FIG. 19 is a diagram viewed in a direction of an axis of the stator. FIG. 19 schematically illustrates magnetic poles of a magnet rotor in a semi-elliptical shape. In FIG. 19, members inside the magnet rotor and a mold of the stator are omitted. FIG. 20 is a diagram viewed in a radial direction of the stator. FIG. 20 schematically illustrates the magnetic sensors and pole teeth of the stator. In the description below, elements having the same (including substantially the same) configurations as those of the electric valve 1A according to the second embodiment are denoted by the same reference signs as those of the electric valve 1A, and detailed descriptions of these elements are omitted.

As illustrated in the figures, an electric valve 1B includes a valve body 10, a can 20 a driving section 30B, a valve member 40, and a stator unit 50B. The driving section 30B has the same configuration as that of the driving section 30 of the electric valve 1A except that the permanent magnet 38 and the fixing member 39 are omitted. The stator unit 50B includes a stator 60, a housing 70, a case 80, a main circuit board 90, a sub circuit board 100, a sub circuit board supporting member 105, and two magnetic sensors 110B.

The magnetic sensors 110B are Hall ICs. The magnetic sensors 110B have a surface-mount package. The magnetic sensors 110B are located at a second end 100b of the sub circuit board 100. The magnetic sensors 110B are arranged side by side in a front-and-back direction. Specifically, the two magnetic sensors 110B are positioned at equal distances from an axis L and arranged around the axis L with a gap between them. The magnetic sensors 110B are arranged along an outer surface of a partition wall 76 when viewed in a direction of the axis L. The magnetic sensors 110B face a magnet rotor 31 in the lateral direction with the can 20 and the partition wall 76 in between. The magnetic sensors 110B sense the density of the magnetic flux generated by the magnetic pole of the magnet rotor 31. The magnetic sensors 110B output signals corresponding to the density of the magnetic flux sensed by them. A rotational angle (rotational amount) and a rotational direction of the magnet rotor 31 can be detected based on the signals from the magnetic sensors 110B.

In the electric valve 1B, circuit board terminals 101 are mounted on the upper surface of the sub circuit board 100, and a flat plate portion 106 of the sub circuit board supporting member 105 is mounted on the lower surface of the sub circuit board 100.

As illustrated in FIG. 20, one of the two magnetic sensors 110B is located on a center line C1 of one of multiple pole teeth 61a of an upper stator 61, while the other of the two magnetic sensors 110B is not located on a center line of any of the multiple pole teeth 61a. Each center line is parallel to the axis L. With this configuration, the phase of the signal waveform of one of the two magnetic sensors 110B is shifted from that of the other of the two magnetic sensors 110B. As a result, the rotational direction of the magnet rotor 31 can be detected based on the waveforms. In particular, in the present embodiment, the other of the two magnetic sensors 110B is located on a center line C2 of a pole tooth 62b of a lower stator 62. In other words, the center line C2 passes through the center position between the pole tooth 61a and the pole tooth 61b adjacent to each other. As a result, the overlap period of the signal waveforms of the two magnetic sensors 110B can be shortened. Specifically, a configuration that utilizes two Hall ICs as the two magnetic sensors 110B, for example, the Hall IC outputting an H-signal when an N pole is nearby and outputting an L-signal when an N pole is not nearby, allows for a shorter overlap period of H-signal parts of the signal waveforms of the two magnetic sensors 110B as the magnet rotor 31 rotates. Therefore, the detection accuracy of the rotational angle of the magnet rotor 31 can be improved.

In this specification, terms indicating shapes of members, such as "circular cylindrical" and "circular columnar", are also used for members substantially having the shapes indicated by the terms. For example, "a circular cylindrical member" includes a circular cylindrical member and a substantially circular cylindrical member.

The embodiments of the present invention are described above. The present invention, however, is not limited to these embodiments. Embodiments obtained by a person skilled in the art appropriately adding, removing, or modifying components according to the embodiments described above, and an embodiment obtained by appropriately combining features of the embodiments are included in the scope of the present invention without departing from the spirit of the present invention.

REFERENCE SIGNS LIST

1 . . . electric valve, 1A . . . electric valve, 1B . . . electric valve, 10, . . . valve body, 11 . . . main body portion, 12 . . . circular cylindrical portion, 12a . . . fitting hole, 13 . . . flange portion, 14 . . . valve chamber, 15 . . . flow channel, 16 . . . flow channel, 17 . . . port, 20 . . . can, 30 . . . driving section, 30B . . . driving section, 31 . . . magnet rotor, 32 . . . valve stem holder, 32c . . . internal thread, 33 . . . guide bush, 33a . . . first circular cylindrical portion, 33b . . . second circular cylindrical portion, 33c . . . external thread, 34 . . . valve stem, 34a . . . upper portion, 34b . . . step portion, 35 . . . supporting ring, 36 . . . push nut, 37 . . . valve closing spring, 38 . . . permanent magnet, 39 . . . fixing member, 40 . . . valve member, 50 . . . stator unit, 50A . . . stator unit, 50B . . . stator unit, 60 . . . stator, 60a . . . inner circumferential surface, 61 . . . upper stator, 61a, 61b . . . pole teeth, 62 . . . lower stator, 62a, 62b . . . pole teeth, 63 . . . mold, 64 . . . terminal supporting portion, 65 . . . terminal, 70 . . . housing, 71 . . . peripheral wall portion, 72 . . . dome portion, 72a . . . inner circumferential surface, 73 . . . tubular portion, 74 . . . inner space, 75 . . . sub circuit board space, 76 . . . partition wall, 77 . . . press-fit groove, 78 . . . projection, 78a . . . projection, 78b . . . projection, 80 . . . case, 81 . . . case body, 82 . . . lid body, 83 . . . connector, 84 . . . side wall portion, 84a . . . case opening, 85 . . . supporting column, 85a . . . tip end, 90 . . . main circuit board, 91 . . . circuit board connector, 92 . . . penetrating hole, 93 . . . through hole, 100 . . . sub circuit board, 100a . . . first end, 100b . . . second end, 101 . . . circuit board terminal, 105 . . . sub circuit board supporting member, 106 . . . flat plate portion, 107 . . . mounting portion, 110 . . . magnetic sensor, 110B . . . magnetic sensor, L . . . axis

The invention claimed is:

1. An electric valve comprising:
a valve body;
a can that is bonded to the valve body;
a magnet rotor that is disposed inside the can; and
a stator unit that includes an inner space in which the can is disposed,
wherein the stator unit includes a housing, a stator in a circular cylindrical shape that is housed in the housing, a main circuit board in a flat plate-like shape, a sub circuit board in a flat plate-like shape, and a magnetic sensor that is mounted on the sub circuit board,
wherein the housing includes a sub circuit board space that is located laterally adjacent to the inner space,
wherein a first end of the sub circuit board is connected to the main circuit board via a circuit board terminal,
wherein a second end of the sub circuit board is located near the inner space in the sub circuit board space, and
wherein the magnetic sensor is located closer to the inner space than the circuit board terminal is,
wherein the housing includes a partition wall that separates the sub circuit board space from the inner space, the partition wall being disposed laterally between the sub circuit board space and the inner space,
wherein the main circuit board is disposed parallel to a direction of an axis of the stator, and wherein the sub circuit board is disposed at a right angle to the main circuit board.

2. The electric valve according to claim 1, wherein the housing includes a press-fit groove into which the sub circuit board is press-fitted.

3. The electric valve according to claim 2, wherein the press-fit groove has an inner surface on which a projection is provided, and the projection is in an elastically deformed shape when the sub circuit board is press-fitted into the press-fit groove.

4. The electric valve according to claim 1, wherein the magnetic sensor is located at the second end.

5. The electric valve according to claim 1,
wherein the stator unit further includes a case that is bonded to the housing,
wherein the case includes a wall portion and a supporting column that is provided on the wall portion,
wherein the wall portion includes a case opening that is connected to the sub circuit board space,
wherein the supporting column extends in a direction perpendicular to the direction of the axis and a tip end of the supporting column points in a direction away from the inner space,
wherein the main circuit board includes a penetrating hole,
wherein the sub circuit board is disposed across the case and the sub circuit board space,
wherein a sub circuit board supporting member is mounted on the sub circuit board,
wherein the sub circuit board supporting member includes a mounting portion in a cylindrical shape,
wherein the supporting column is disposed inside the mounting portion and disposed in the penetrating hole,
wherein a diameter of the tip end of the supporting column is larger than a diameter of the penetrating hole, and
wherein the mounting portion is interposed between the wall portion and the main circuit board.

6. The electric valve according to claim 1, further comprising:
a permanent magnet that rotates together with the magnet rotor,
wherein the magnetic sensor is located such that the magnetic sensor senses a magnetic field generated by the permanent magnet.

7. The electric valve according to claim 1, wherein the sub circuit board space extends laterally between the inner space and a side surface of the housing.

8. The electric valve according to claim 1, wherein the partition wall has an arc shape along an outer circumferential surface of the inner space and a radially inner surface of the sub circuit board space has the arc shape of the partition wall.

9. The electric valve according to claim 8, wherein the second end of the sub circuit board has an arc shape matching the arc shape of the partition wall.

* * * * *